United States Patent [19]

Rosenquist

[11] 4,412,060
[45] Oct. 25, 1983

[54] CYCLOALKYL CARBONYL END-CAPPED AROMATIC POLYCARBONATES

[75] Inventor: Niles R. Rosenquist, Evansville, Ind.

[73] Assignee: General Electric Company, Mt. Vernon, Ind.

[21] Appl. No.: 386,740

[22] Filed: Jun. 9, 1982

[51] Int. Cl.³ .............................................. C08G 63/62
[52] U.S. Cl. .................................... 528/196; 528/173; 528/191; 528/202; 528/204
[58] Field of Search ............... 528/202, 196, 173, 204, 528/191; 260/463

[56] References Cited

U.S. PATENT DOCUMENTS 3,475,373 10/1969 Jackson, Jr. et al. .................. 260/47
4,097,457 6/1978 Megumi et al. ...................... 528/202

FOREIGN PATENT DOCUMENTS 2716304 12/1978 Fed. Rep. of Germany .
51-34992 3/1976 Japan .

*Primary Examiner*—Theodore E. Pertilla
*Attorney, Agent, or Firm*—Martin B. Barancik

[57] ABSTRACT

Aromatic polycarbonate chain terminated with a cyclic ester.

8 Claims, No Drawings

CYCLOALKYL CARBONYL END-CAPPED AROMATIC POLYCARBONATES

BACKGROUND OF THE INVENTION

The importance of chain terminating aromatic polycarbonate has been known for many years. Non-chain terminated aromatic polycarbonates are insufficiently heat stable since the free phenolic end groups provide a reactive site which is detrimental to the resin stability. The absence of a chain terminating agent or condition during the preparation of aromatic polycarbonate leads to a polymer with an overall molecular weight which frequently is so high that the polymer is too viscous to mold at reasonable temperatures.

Standard chain terminating agents employed in the preparation of aromatic polycarbonate are members of the phenol family such as phenol itself and tert.butyl phenol. Other chain terminating agents have been disclosed but these moieties seem to have diminished certain of the positive characteristics of the aromatic polycarbonate. For example, German Offenlegungsschrift No. 27 16 304, laid open Oct. 19, 1978, discloses the use of a relatively long chain carboxylic acid or carboxylic acid halide ($C_{9-26}$) in conjunction with the usual phenolic chain stopper. Athough melt viscosity is lowered thereby permitting easier processing of the resin, a significant lowering of the heat resistance of the polymer as measured by Vicat temperature as well as embrittlement of the resin upon aging at elevated temperatures also occur. Improved melt viscosity (fluidity) was also obtained in Japanese Kokai No. 76 34,992 laid open Mar. 25, 1976, when capryloyl chloride was employed as a chain terminating agent for an aromatic polycarbonate. However the fluidity comparison was to a non-chain terminated aromatic polycarbonate prepared under the same conditions. Reaction of the phenolic groups of non-chain terminated final polymerized polycarbonate has been undertaken in U.S. Pat. No. 3,475,373. In this patent, final polymerized polycarbonate was disclosed as being treated with an acyl halide followed by a hydroxy compound to combine with the excess halide. Various alkyl and aryl acyl halides as well as chloroformates were named as "typical acyl halides". Isopropyl chloroformate and isobutyryl chloride were included in the lists as "typical halides". Reaction of the end groups of the final polymer was undertaken since it was believed that the presence of chain terminator during the preparation of the polymer did not modify all of the characteristic hydroxyl or phenolic groups of the polymer. The high temperature oxidative stability of the polycarbonate polymer prepared according to the invention of the patent was compared with the non-chain terminated polymer.

In contrast to these earlier attempts to chain terminate an aromatic polycarbonate, the use of the cycloalkyl acyl agents of this invention brings about a chain terminated aromatic polycarbonate with a higher heat resistance and better impact resistance after aging at an elevated temperature than the use of straight alkyl acyl agents. The heat resistance and impact resistance after aging at an elevated temperature of aromatic polycarbonate chain terminated with the cyclic agents of this invention is similar to or better than the aromatic polycarbonate chain terminated with a standard agent, phenol.

BRIEF SUMMARY OF THE INVENTION

In accordance with this invention there is a composition comprising an aromatic polycarbonate chain terminated with a residue having a structure of the Formula I

wherein R is cycloalkyl of four to seven ring carbon atoms, inclusive or methyl substituted cycloalkyl of four to seven ring carbon atoms, inclusive, wherein from one to three of the hydrogens of the cycloalkyl group are replaced by a methyl group.

DETAILED DESCRIPTION OF THE INVENTION

Aromatic polycarbonates can be prepared by any of the usual procedures. These polymers can be prepared by reacting a dihydric phenol with a carbonate precursor in an interfacial polymerization process. Typical of some of the dihydric phenols that may be employed in the practice of this invention are 2,2-bis(4-hydroxy phenyl)propane (bisphenol-A), (2,2-bis(4-hydroxy-3-methylphenyl)propane, 4,4-bis(4-hydroxyphenyl)heptane, 2,2-(3,5,3',5'-tetrachloro-4,4'-dihydroxydiphenyl)-propane, 2,2-(3,5,3',5'tetrabromo-4,4'-dihydroxydiphenyl)propane, (3,3'-dichloro-4,4'-dihydroxyphenyl)methane, bis 4-hydroxy phenyl sulfone and bis 4-hydroxy phenyl sulfide. Other dihydric phenols of the bisphenol type are also available and are disclosed in U.S. Pat. No. 2,999,835; 3,028,365 and 3,334,154. Bisphenol A is preferred.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di(chlorophenyl) carbonate, di-(bromophenyl) carbonate, di-(trichlorophenyl) carbonate, di-(tribromophenyl) carbonate, etc. di-(alkylphenyl) carbonate such as di(tolyl) carbonate, etc., di-(naphthyl) carbonate, di(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bis-chloroformates of hydroquinone), or glycols (bis-haloformates of ethylene glycol, neopentyl glycol, polyethylene glycol, etc.). While other carbonate precursors will occur to those skilled in the art, carbonyl chloride, also known as phosgene, is preferred.

Transesterification processes utilizing diphenyl carbonate are also well known and can be employed for the preparation of aromatic polycarbonate.

In utilizing the interfacial polymerization process, the polycarbonate polymers of this invention are generally prepared by employing a chain terminating agent, an acid acceptor and a catalyst. A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethyl ammonium bromide, cetyl triethyl ammonium bromide, tetra-n-heptyl-ammonium iodide, tetra-n-propyl-ammonium bromide, tetra-methyl-ammonium chloride, tetra-methyl ammonium hydroxide, tetra-n-butylammonium iodide, benzyltrimethylammonium chloride and quaternary phosphonium compounds such as, for example, n-butyltriphenyl phosphonium bromide and methyltriphenyl phosphonium bromide.

The chain terminating agent functions as a molecular weight regulator in the process of this invention. The residue previously defined in Formula I can be derived from various agents. It is preferred to use an acid halide or acid of the formula $$\underset{\underset{X}{\overset{O}{\overset{\|}{R-C-X}}}}{} \qquad II$$

wherein X is chlorine, bromine or hydroxy and R is as previously defined in Formula I. It is preferred to use the acid chloride, X is chlorine, particularly where there is only four carbon atoms. The chain terminating agent of Formula II reacts with the OH of the bisphenol thereby making an ester bond as shown in Table I. The compound of Formula II is added to the reactor vessel so its presence can influence the chain length as well as merely react with the phenol end group. The addition of the chain terminating agent can be made initially, prior to the addition of the carbonate precursor or during the addition of the carbonate precursor, and in general at any time up to the point of reaction where the degree of polymerization approaches that of a high polymer. It is preferably added initially.

The quantity of chain terminating agent which can be added is an effective amount of agent to prepare an aromatic polycarbonate having a conventional molecular weight. As mole % of diphenol employed in the reaction this quantity will vary from about 1 to about 7 mole percent, preferably 2 to about 5 mole percent.

With respect to the chain terminating agent of Formula II, the cycloalkyl of four to seven carbon atoms inclusive are cyclobutyl, cyclopentyl, cyclohexyl and cycloheptyl. Examples of methyl substituted cycloalkyls are illustrated below:

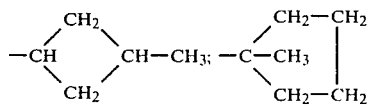

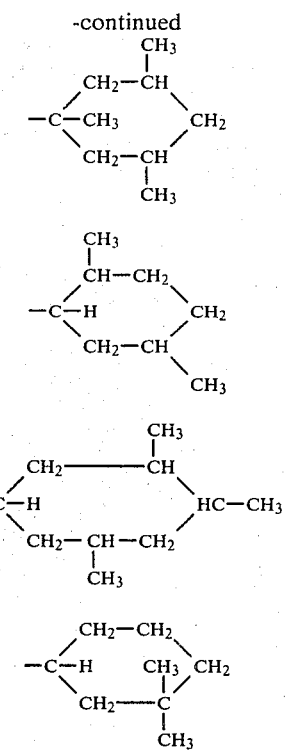

and the like.

Below are specific examples of the invention. These examples are intended to illustrate and not limit the inventive concept. Also included in the Tables and Preparations are comparative and control examples. Intrinsic viscosity (I.V.) is measured in methylene chloride at 25° C. Melt Flow was determined according to modified ASTM D-1238. Izod impacts were obtained according to ASTM D256 and are reported in ft/lbs/in. of notch. Tg as previously noted is the secondary transition temperature. DTUL also as previously noted is the distortion temperature under load obtained according to a modified ASTM D-648.

PREPARATION A

Chain Terminated Bisphenol-A Polycarbonate

Resin Preparation

A 1000 ml four neck flask was fitted with a mechanical stirrer, a pH probe, aqueous caustic inlet tube and a Claisen adapter to which was attached a dry ice condenser and a gas inlet tube. To the flask was added 280 ml water, 340 ml methylene chloride, 1.4 ml triethyl amine (0.01 mole) and 57 g (0.25 mole) bisphenol-A. With stirring the pH was raised to 10 by addition of 25% aqueous sodium hydroxide, then 0.00925 mole (3.7 mole%) based upon mole of BPA of the acid or acid chloride end-capping agent was added. Phosgene was introduced into the flask at 1 g/min for 30 minutes (0.3 mole) with pH maintained at 9.5 to 11.5. The pH was adjusted to 11 at the end of the reaction. The resin layer was separated fron the brine layer, then washed with 3 wt. % aqueous HCl until washing remained acidic, then twice with distilled water. The resin was then precipitated into 1500 ml of methanol in a Waring blender and washed with 500 ml more methanol.

Using the above procedure various chain terminated bisphenol-A polycarbonates were prepared. The I.V.

and Tg in °C. is reported for each polycarbonate. The carbon number in parentheses refers to the number of carbon atoms in normal alkyl chain or cycloalkyl ring.

TABLE I

| CHAIN TERMINATOR | END CAP STRUCTURE | I.V. dl/g. | Tg |
|---|---|---|---|
| Phenol | | .491 | 150.3 |
| Hexanoyl chloride (C5)[a] | O–C(=O)/\/\/ | .495 | 147.0 |
| Cyclopentane carboxylic acid (C5) | O–C(=O)–⬠ | .502 | 153.6 |
| Cyclohexane carboxylic acid (C6)[b] | O–C(=O)–⬡ | .495 | 153.8 |
| Octanoic acid (C7)[c] | O–C(=O)/\/\/ | .454 | 144.7 |
| Cycloheptane carboxylic acid (C7) | O–C(=O)–⬢ | .478 | 152.9 |

[a] average of two runs
[b] cyclohexane carboxylic acid chloride and cyclohexane carboxylic acid used as chain terminating agents at different times from above sample gave close I.V., .455 and .467 as well as Tg 151.6 and 151.2 respectively.
[c] average of two runs As is observed from the data in Table I, there is a definite and significant upward movement in Tg when the structure of the chain terminator is varied from a straight chain alkyl to a cycloalkyl. The Tgs obtained with the cycloalkyl chain terminating agent is substantially higher than the Tgs obtained with phenol, a standard chain terminating agent.

Preparation B

Chain Terminated Bisphenol-A Polycarbonate Utilizing a Larger Reactor Vessel

To a reactor fitted with a mechanical agitator were charged 5.5 liters of deionized water, 10 liters of methylene chloride, 2280 grams (10 moles) of bisphenol-A, 28 milliliters of triethylamine, 3.4 grams of sodium gluconate, and 0.40 mole of chain terminating agent. Phosgene was introduced at the rate of 18 grams/minute and phosgenation is continued for 60 minutes. The pH was maintained at between 8.0 and 10.0 by the addition of 25% aqueous sodium hydroxide. After phosgenation has ceased 4 liters of methylene chloride were added, the brine layer separated by centrifuge and the resin solution washed with aqueous acid water. The resin was steam precipitated and dried. To this resin product were added minor amounts (about 0.03 parts by weight per hundred parts by weight of resin) of a phosphite and of an epoxy stabilizer. This resin product was then fed to an extruder operating at a temperature of about 500° F. to extrude the resin into strands and the extruded strands chopped into pellets. The pellets were then injection molded at about 570° F. into test samples measuring about $2\frac{1}{2}'' \times \frac{1}{2}'' \times \frac{1}{8}''$.

Using the above procedure several chain terminated bisphenol-A polycarbonates were prepared. The I.V., Melt Flow, DTUL and aged impact strength at an elevated temperature were reported. The superscript on the Notched Izod values is the percent ductility. If no superscript is noted, the samples were 100 percent ductile.

TABLE II

| CHAIN TERMINATOR | I.V. | M.F. | DTUL °C. | IN NOTCHED IZOD AGED AT 90° C. | | |
|---|---|---|---|---|---|---|
| | | | | 24 hrs. | 48 hrs. | 96 hrs. |
| Phenol | .480 | 12.3 | 134.6 | 14.3 | $7.2^{40}$ | $2.7^{0}$ |
| Cyclohexane carboxylic acid | .535 | 6.1 | 135.4 | — | $13.6^{80}$ | $13.6^{80}$ |

As is observed from the data in Table II, the DTUL of the cyclic chain terminating agent is significantly higher than the standard agent, phenol. Additionally, the aged impact resistance at elevated temperatures is significantly greater and more ductile for the cyclic agent as opposed to phenol.

What is claimed is:

1. An aromatic polycarbonate chain terminated with a residue having a structure of the Formula $$R-\overset{O}{\underset{\|}{C}}-$$

wherein R is cycloalkyl of four to seven ring carbon atoms, inclusive, or methyl substituted cycloalkyl of four to seven ring carbon atoms, inclusive, wherein from one to three hydrogen atoms of the cycloalkyl group are replaced by a methyl group.

2. A polycarbonate in accordance with claim 1 wherein R is cycloalkyl of four ring carbon atoms or methyl substituted cyclo alkyl of four ring carbon atoms.

3. A polycarbonate in accordance with claim 2 wherein R is cycloalkyl of four ring carbon atoms.

4. A polycarbonate in accordance with claim 1 wherein R is cycloalkyl of five to seven ring carbon atoms, inclusive, or methyl substituted cycloalkyl of five to seven ring carbon atoms inclusive.

5. A polycarbonate in accordance with claim 4 wherein R is cycloalkyl of five ring carbon atoms.

6. A polycarbonate in accordance with claim 4 wherein R is cycloalkyl of six ring carbon atoms.

7. A polycarbonate in accordance with claim 4 wherein R is cycloalkyl of seven ring carbon atoms.

8. A polycarbonate in accordance with claims 3, 5, 6 or 7 wherein the aromatic polycarbonate is derived from bisphenol-A and a carbonate precursor.

* * * * *